United States Patent [19]
Booher

[11] Patent Number: 5,655,792
[45] Date of Patent: *Aug. 12, 1997

[54] COMPOSITE TRAILER AND VAN TYPE CONTAINER ASSEMBLY USING BI-METAL MATERIALS

[75] Inventor: Howard Booher, Randolph, Ohio

[73] Assignee: East Manufacturing, Randolph, Ohio

[*] Notice: The term of this patent shall not extend beyond the expiration date of Pat. No. 5,474,331.

[21] Appl. No.: 483,152

[22] Filed: Jun. 7, 1995

Related U.S. Application Data

[63] Continuation-in-part of Ser. No. 368,151, Dec. 29, 1994, Pat. No. 5,474,331.

[51] Int. Cl.⁶ .................. B62D 21/20; B62D 21/02; B62D 33/02; B62D 33/04
[52] U.S. Cl. .................. 280/789; 280/781; 280/799; 296/181; 296/182; 228/262.44; 220/1.5
[58] Field of Search .................. 280/789, 781, 280/799, 796, 785, 423.1; 296/182, 900, 181, 29; 228/262.44, 189; 220/1.5

[56] References Cited

U.S. PATENT DOCUMENTS

| | | |
|---|---|---|
| 2,600,140 | 6/1952 | Torseth . |
| 2,758,870 | 8/1956 | Nallinger . |
| 2,812,192 | 11/1957 | Cole ............................ 280/789 |
| 3,100,338 | 8/1963 | Henry . |
| 3,175,284 | 3/1965 | Cotovsky . |
| 3,295,197 | 1/1967 | Bunn et al. . |
| 3,319,393 | 5/1967 | Tantlinger et al. ............ 296/182 |
| 3,460,235 | 8/1969 | Roberts et al. . |
| 3,597,832 | 8/1971 | Calton et al. . |
| 3,612,569 | 10/1971 | Marinelli ........................ 280/789 |
| 3,630,694 | 12/1971 | Enright et al. ............... 228/262.44 |
| 3,664,816 | 5/1972 | Finnegan ..................... 228/262.44 |
| 3,872,577 | 3/1975 | Kugler et al. ............... 228/262.44 |
| 3,975,612 | 8/1976 | Nakazaki et al. . |
| 4,212,405 | 7/1980 | Schmidt . |
| 4,281,235 | 7/1981 | Peloquin ..................... 228/262.44 |
| 4,534,589 | 8/1985 | Booher ......................... 296/182 |
| 4,564,233 | 1/1986 | Booher ......................... 296/182 |
| 4,626,022 | 12/1986 | Booher ......................... 296/182 |
| 4,787,669 | 11/1988 | Wante .......................... 280/789 |
| 4,904,017 | 2/1990 | Ehrlich . |

FOREIGN PATENT DOCUMENTS

| | | | |
|---|---|---|---|
| 437655 | 7/1991 | European Pat. Off. | 280/789 |
| 4-81288 | 3/1992 | Japan | 228/262.44 |
| 2203393 | 10/1988 | United Kingdom | 280/789 |

Primary Examiner—Brian L. Johnson
Assistant Examiner—Peter C. English
Attorney, Agent, or Firm—Oldham & Oldham Co., LPA

[57] ABSTRACT

The present invention is directed to a unique composite trailer and van type container for the transport and management of bulk freight utilizing steel and aluminum components to take advantage of the durability and light weight of aluminum components and the proven strength and fabrication ease of structural steel. More particularly, the composite trailer and container comprises the integration of two dissimilar metals secured together by using a bi-metal intermediate element. The bi-metal intermediate element provides for the welding of different metals together thereby forming a superior bond between the intermediate element and dissimilar metals. This construction also makes it possible to eliminate the galvanic corrosion so often experienced with contact between different metals.

33 Claims, 5 Drawing Sheets

COMPOSITE TRAILER AND VAN TYPE CONTAINER ASSEMBLY USING BI-METAL MATERIALS

This is a continuation-in-part patent application of Ser. No. 08/368,151, filed Dec. 29, 1994, U.S. Pat. No. 5,474,331.

BACKGROUND OF THE INVENTION

1. Technical Field

This invention relates to a composite trailer and van type container for transportation and management of bulk freight, and more particularly to the fabrication of these trailers and containers using both steel and aluminum components. This fabrication, therefore, requires the joining of dissimilar materials in a strong durable joint.

2. Background of the Invention

Using different composite materials in the construction of tractor trailers, as well as van type containers used for transportation and management of bulk freight, would be preferred over the traditional construction generally comprising either all steel or all aluminum. Trailers or van type containers constructed of all steel are generally heavier, thereby reducing the amount of allowable payload, while trailers and containers constructed of all aluminum are generally more expensive and often not as structurally reliable since aluminum is not as durable by volume as structural steel.

However, trailers and containers used for hauling bulk freight which are constructed of dissimilar composite metals are even less reliable. The metalurgical incompatibilities between the joints of dissimilar metals prevent direct welding. Therefore, the use of mechanical fasteners such as bolts and brackets are used. These techniques often fail when exposed to the hazards of the road and the environment. For example, the different metallurgical properties, including the rate of flexibility between aluminum alloys and ferrous metals, cause the fasteners to work loose. Further, corrosion and galvanic reactions between dissimilar trailer and container metal components tend to shorten its useful life by premature failure at the joining interface. This is particularly true in the case of attaching steel components to aluminum components used in trailer construction.

In the past, the assembly of steel to aluminum parts has been tried using an insulating barrier between these metals to try to reduce galvanic corrosion. Even with this special assembly, however, some dissimilar metal contact occurs since it is necessary to make the connection of the two dissimilar metal parts with fasteners of one material or the other, as previously described. Therefore, the probability of a galvanic reaction causing electrolytic corrosion has always been unavoidable using this technique for the fabrication of tractor trailers since it is virtually impossible to effect a perfect insulating barrier between the dissimilar metals.

Other structures with composite metals have used a variety of different joining techniques in an attempt to improve the reliability between the interface; See for example U.S. Pat. Nos. 4,281,235, 3,975,612, 3,872,577, 3,664,816, 3,597,832, 3,460,235, 3,175,284, 3,295,197 and 3,100,338. Additionally, U.S. Pat. Nos. 2,600,140, 2,758,870, 4,212,405 and 4,904,017 can be viewed.

In U.S. Pat. No. 4,281,235, a method for joining ferrous alloys to aluminum and aluminum alloys is accomplished by coating the portion of the ferrous alloys to be welded with an intermediate material compound or element such as gold alloy or silver. The contact area to be joined is then bombarded by an accelerated particle beam to effect the union.

In U.S. Pat. No. 3,975,612 a welding method for dissimilar metals is disclosed wherein a filler metal is deposited an one end of a dissimilar metal and then joined with the other metal which has the same composition as that of the deposited filler material.

In U.S. Pat. No. 3,664,816, a steel to aluminum transition piece is shown in which the transition joint is formed by making a pressure weld between an aluminum alloy and steel through a special aluminous bonding element. The aluminous bonding element is primarily aluminum with the transition material being stainless steel as the steel element.

In U.S. Pat. No. 3,597,832, inertia welding of steel to aluminum is disclosed describing friction welding to join a pair of conical interacting configurations of dissimilar metal. In U.S. Pat. No. 3,175,284, a method of friction welding of dissimilar metals is disclosed in which the surface of one material is rotated relative to the other surface so as to generate heat for the welding process.

In U.S. Pat. No. 3,295,197, the disclosure shows a stainless steel member bonded with an aluminum member in a composite metal configuration. Finally, in U.S. Pat. No. 3,100,338, a method is disclosed for joining aluminum metal to refractory hard metals using a flux composition in the joining process.

OBJECTS AND ADVANTAGES OF THE INVENTION

It is an object of the present invention to provide composite trailer and container construction that has improved and more reliable performance by selectively using dissimilar metals for different trailer and container parts. Using bi-metal intermediate connectors, dissimilar metals can be more easily bonded using conventional welding practices so as to produce a superior composite bond more capable of resisting operational stress than experienced in the past. Additionally, it is the object of this invention to provide the means to effectively connect dissimilar metals in a manner that separates and isolates them, thereby preventing failures caused by galvanic corrosion.

SUMMARY OF THE INVENTION

With respect to a composite trailer and container construction, this invention utilizes bi-metal intermediate connecting elements to join dissimilar metal structures using conventional welding practices.

In the case of composite platform trailers, bi-metal connecting elements make it possible to effectively join the aluminum cross frame members to the steel support beams. Additionally, the aluminum floor boards, or decking, can be securely attached to both sides of the top flanges of the steel beams by conventional welding using the intermediate bi-metal elements. In the case of composite van trailers and van type containers used for hauling bulk freight, bi-metal connecting elements make it possible to effectively join the steel cross frame members to the aluminum side rails. Both these constructions reduce the weight of the trailer and container, while greatly improving the structural resistance to lateral bending and corrosion.

DESCRIPTION OF THE PREFERRED EMBODIMENT

Figure 1:
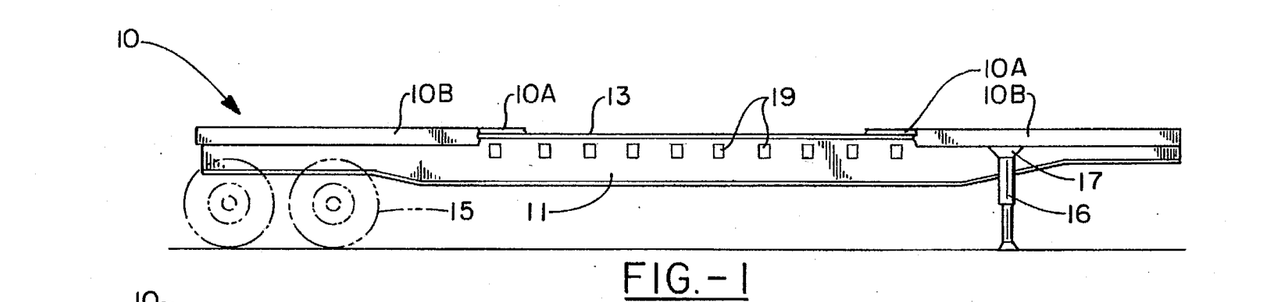
FIG. 1 is a side elevational view of a composite trailer assembly.
Figure 2:
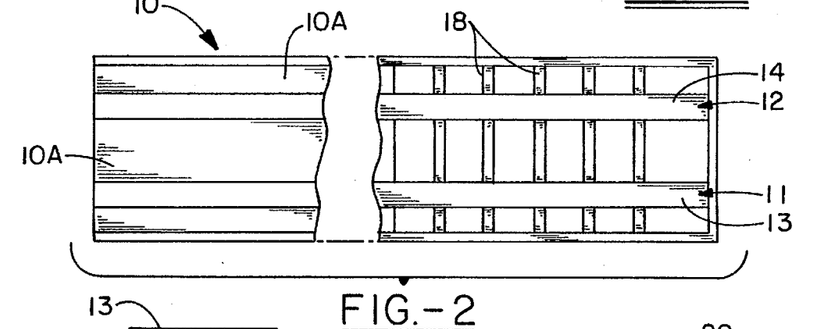
FIG. 2 is a top plan view with a portion broken away of the composite trailer assembly of FIG. 1.

A composite platform trailer assembly, chosen for illustration in FIGS. 1 and 2 of the drawings, is a flat bed trailer 10. The flat bed trailer 10 can be seen having a frame assembly formed of a pair of horizontally spaced longitudinally extending I-shaped steel beams 11 and 12 with respective upper bidirectional flanges 13 and thereon. The frame assembly also has a plurality of cross frame members 18 being perpendicularly aligned with the steel beams 11 and 12.

Wheels 15 are shown in broken lines in FIG. 1 of the drawings on a wheel support assembly, not shown, which is positioned under the rear portion of the composite platform trailer assembly and secured to the longitudinally extending steel beams 11 and 12, as will be well known and understood by those skilled in the art. A retractable dual leg support 16 is attached to the forward portion of the composite trailer assembly by brackets 17, and the trailer bed 10A has a plurality of deck members attached on top of the frame assembly, thereby defining a typical platform trailer as illustrated.

In this invention, it will be seen that the plurality of cross frame members 18 are aluminum and may have several different cross-sectional shapes, including a C-shaped configuration. The aluminum cross frame members 18 are located in longitudinally spaced transverse aligned openings 19 in the upper portions of the respective longitudinally extending steel I-beams 11 and 12 as hereinbefore described. Each of the respective cross frame members 18 is positioned through said respective aligned openings 19 in the steel beams 11 and 12 and are secured thereto by welding using a bi-metal connecting element 20, best seen in FIGS. 3, 4, 8, and 9 of the drawings. The bi-metal connecting element 20 is composed of an aluminum alloy 20A bonded to a ferrous metal alloy 20B such as structural steel.

Referring now to FIGS. 5, 6, 7 and 9, the bi-metal element 20 can be seen having a contoured elongated rectangular configuration with oppositely disposed parallel sides 21 and 22, as well as 23 and 24, respectively. The bi-metal connecting element 20 also has an angularly disposed sidewall 25 interconnecting the respective sidewalls 22 and 24. The bi-metal element 20 is divided along a material transition line 26 between the aluminum alloy 20A and the ferrous metal alloy 20B so that the aluminum alloy 20A defines all of the respective sidewall surfaces 21 and 24, and a portion of the sidewall surfaces 23 and 25. Conversely, the ferrous metal alloy 20B defines all of the sidewall surface 22 and a portion of the respective sidewall surfaces 23 and 25.

Figures 7, 8, 9, 10, 11:
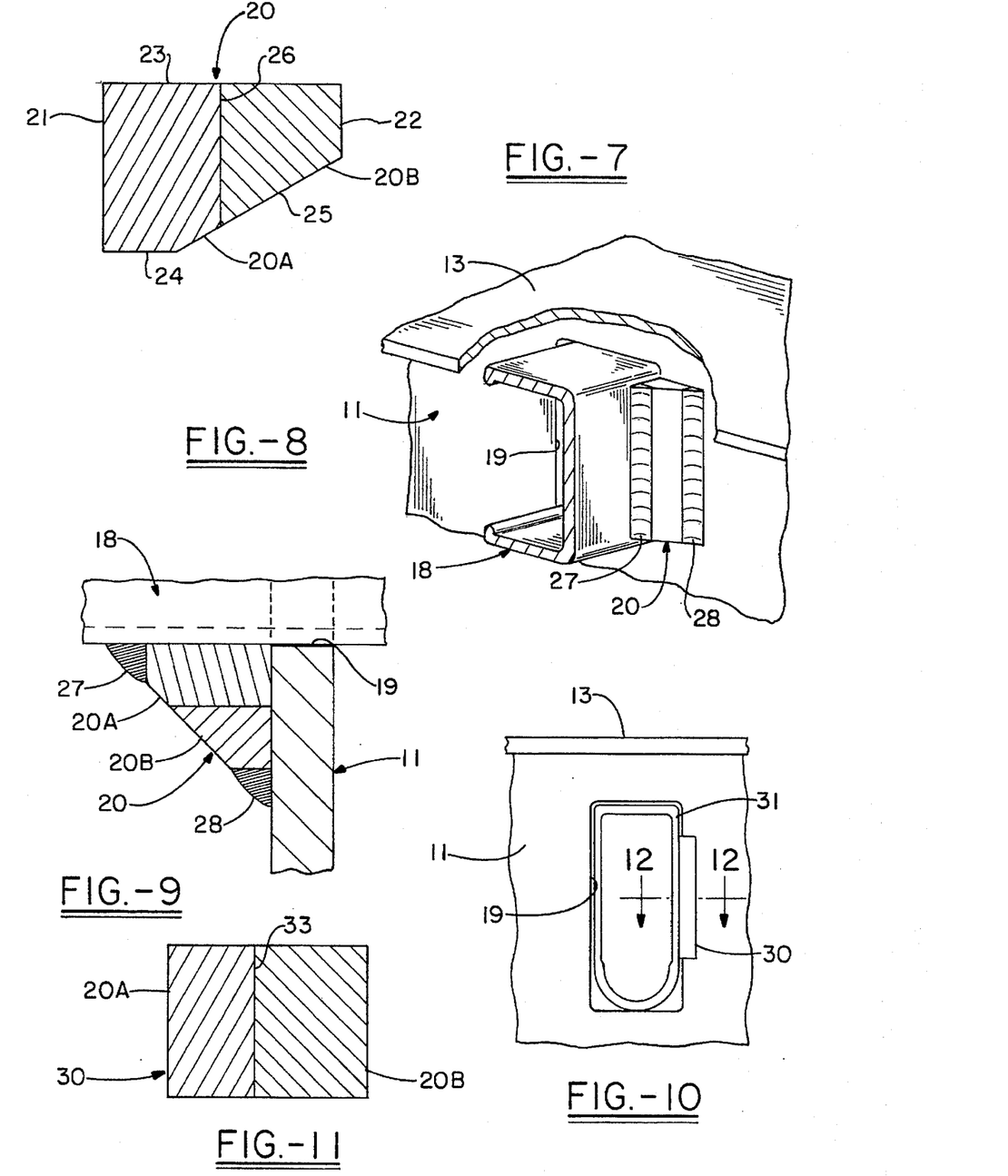
FIG. 7 is an enlarged cross-sectional view on lines 7—7 of FIG. 5.
FIG. 8 is an enlarged perspective view of a portion of the composite trailer assembly with parts broken away.
FIG. 9 is an enlarged cross-sectional view of a weld joint formed between the dissimilar materials as illustrated in FIG. 8.
FIG. 10 is an enlarged side view of a portion of the composite trailer showing an alternate cross beam configuration interconnected between two dissimilar metals using an alternate bi-metal configuration.
FIG. 11 is an enlarged cross-sectional view of an alternate bi-metal configuration illustrated in FIG. 10.
Figure 12:
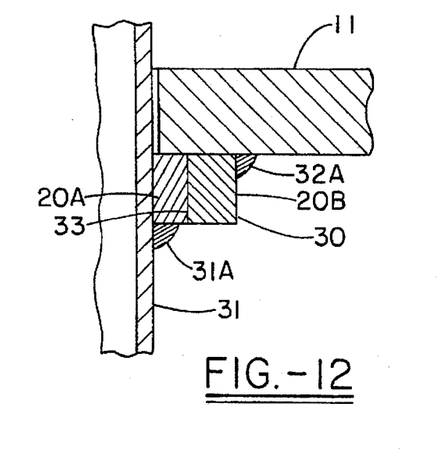
FIG. 12 is an enlarged cross-sectional view of a weld joint formed between two dissimilar metals using an alternate bi-metal configuration.

The characteristic shape and transition point of the bi-metal connecting element 20 is critical to the selective application in the composite platform trailer assembly construction as will be seen in applied application by referring to FIGS. 8 and 9 of the drawings. FIG. 9 shows an enlarged cross-sectional view of a completed weld joint assembly between one of the cross frame members 18 and the steel I-beam 11. An aluminum to aluminum weld 27 is possible by using the bi-metal element 20 configuration that provides the optimum amount of adjacent aluminum surfaces positioned in this illustration at right angles to one another. This configuration allows for a high quality aluminum weld required in composite platform trailer construction.

Figures 3, 6:
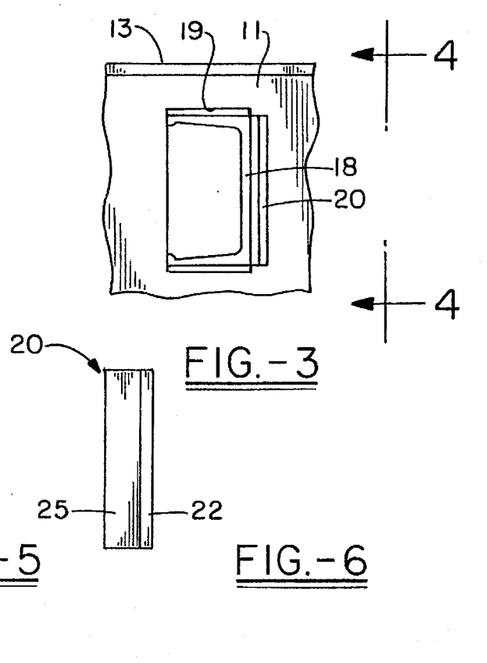
FIG. 3 is an enlarged side view of a portion of the composite trailer showing the interconnection between two dissimilar metals.
FIG. 6 is a side view of the bi-metal element of FIG. 5.
Figure 4:
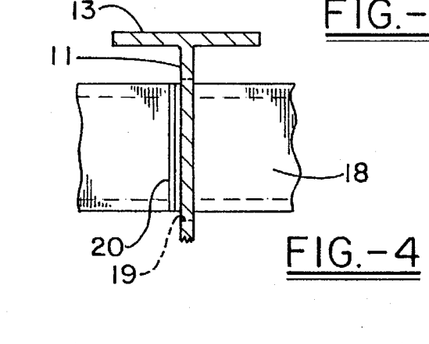
FIG. 4 is an enlarged cross-sectional view on lines 4—4 of FIG. 3.
Figure 5:
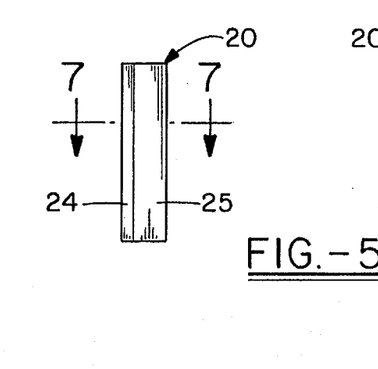
FIG. 5 is an enlarged front view of a bi-metal element.

A steel alloy to steel alloy weld 28 is also possible with the use of the bi-metal element 20 configuration providing a 90 degree right angular joining relationship between the surfaces to be welded. Referring to FIG. 3 of the drawings, it will be seen that the openings 19 in the respective longitudinal I-beams 11 and 12 are dimensionally larger than the respective cross-sections of the cross-frame members 18 so that the cross-frame members 18 will be positioned within the openings 19 in spaced relation to the I-shaped steel beams 11 and 12. The respective completed bi-metal welds 27 and 28 effectively isolate direct contact between the structural elements of dissimilar materials thereby eliminating galvanic reaction and associated corrosion typically present in dissimilar metal joining techniques such as mechanical fasteners and the like described above.

Figure 13:
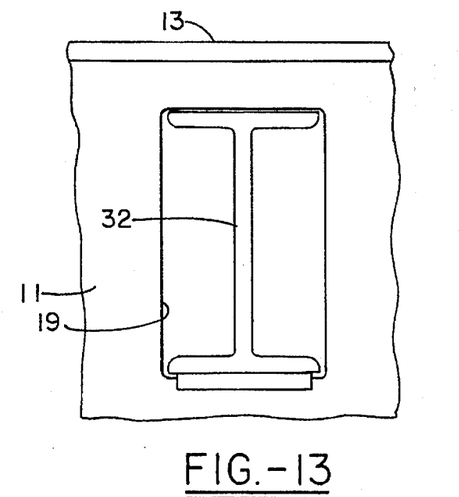
FIG. 13 is an enlarged cross-sectional view of an alternate cross member element weld joint using an alternate bi-metal construction illustrated in FIG. 11.

Referring now to FIGS. 10 through 13 of the drawings, alternate forms of the invention can be seen utilizing a different bi-metal element configuration 30 to join alternate cross frame member shapes, specifically a hollow cross frame member 31 best seen in FIG. 10 of the drawings, and an I-shaped cross frame member 32 best illustrated in FIG. 13 of the drawings. An alternate shape of the bi-metal element 30 is of an elongated cross-sectionally rectangular configuration divided along a material transition line 33 between said aluminum alloy 20A and said ferrous metal alloy 20B.

The respective cross frame member configurations 31 and 32 are positioned through said aligned openings 19 in the hereinbefore described steel beams 11 and 12. The respective cross frame members 31 and 32 are secured to the steel beams 11 and 12 by respective aluminum to aluminum weld joints 31A and ferrous metal to ferrous metal weld joints 32A, best illustrated in FIG. 12 of the drawings where the hollow cross frame member 31 is specifically illustrated.

Figure 14:
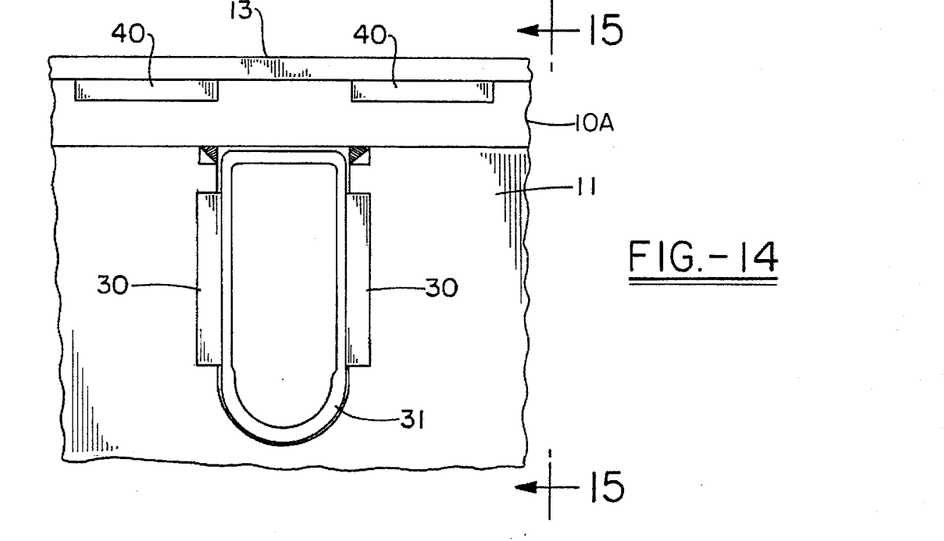
FIG. 14 is an enlarged side view of a portion of the composite trailer showing the alternate cross-beam configuration with an aluminum decking secured to a dissimilar I-beam material.
Figure 15:
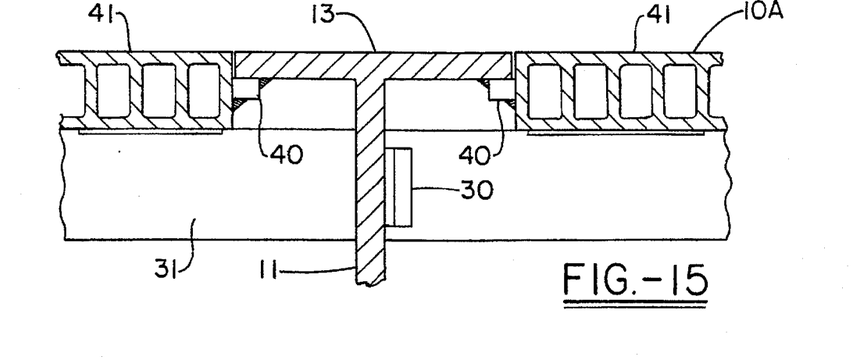
FIG. 15 is an enlarged cross-sectional view on lines 15—15 of FIG. 14.

Referring now to FIGS. 14 and 15 of the drawings, the steel I-beam 11 is illustrated with the alternate cross frame configuration 31 which is hollow. The bi-metal element 30 hereinbefore described is positioned adjacent to the aligned openings 19 within the steel I-beams 11 and 12 to secure the cross frame member 31 to the steel I-beam.

The plurality of aluminum deck members of the trailer bed 10A are positioned on top of the cross frame members 31 and in space relationship to both sides of the upper flanges 13 and 14 of the steel I-beams 11 and 12 respectively. Secondary bi-metal elements 40 are positioned below the perimeter edges of the bidirectional flanges 13 and 14 so as to be in engaging relationship with the respective aluminum trailer deck 10A. The bi-metal element 40 is an elongated cross-sectional rectangular configuration divided along a material transition line same as the said hereinbefore described bi-metal element 30, shown in FIG. 11 of the drawings.

The aluminum trailer deck 10A is comprised of a plurality of cross-sectionally honeycomb channels 41 illustrated in FIG. 15 of the drawings. The honeycomb channels 41 are made of an aluminum-type material and are welded to the upper bidirectional flanges of the longitudinal steel I-beams 11 and 12 using bi-metal material 40. The honeycomb channels 41 are also resupported to the cross frame members using conventional aluminum to aluminum welds.

It will be evident to those skilled in the art that the utilization of even other alternate cross frame member configurations than those disclosed above could be used. It will also be apparent from the above description that by integrally welding the aluminum trailer deck 10A to the steel support frame members using bi-metal components as described herein, a superior composite platform trailer construction is achieved.

Figure 16:
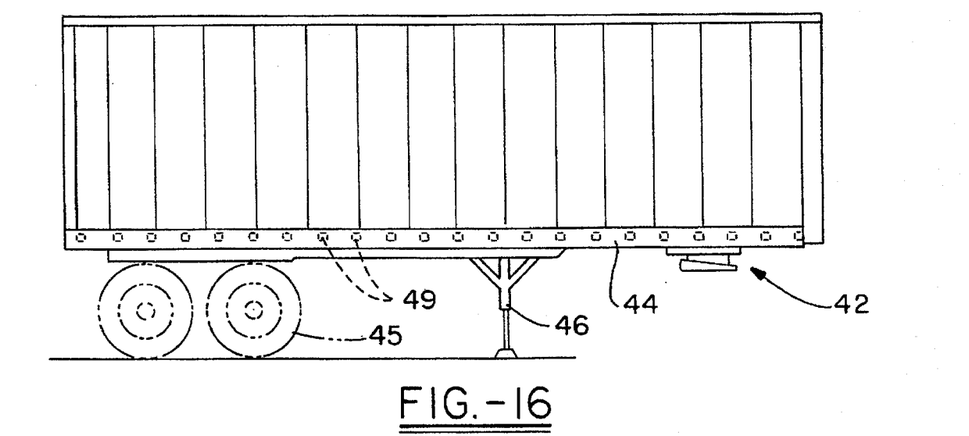
FIG. 16 is a side view of a composite van trailer assembly.
Figure 17:
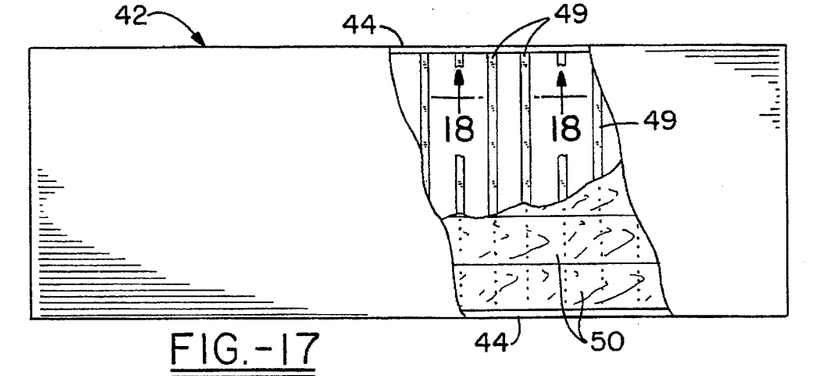
FIG. 17 is a top plan view with a portion broken away of the composite van trailer assembly of FIG. 16.

Continuing with an application of the bi-metal element to the construction of composite van trailers 42, the typical body structure is best seen in FIGS. 16 and 17. The body structure having a frame assembly consisting of a plurality of steel cross frame members 49 transversely extending to connect with a pair of side rails 44. In this invention the side rails 44 are made of aluminum instead of steel. A typical composite van trailer has wheels 45 shown in broken lines in FIG. 16 of the drawings on a wheel support assembly, not shown, which are positioned under the rear portion of the van trailer assembly and secured to several rearmost cross frame members 49. Further, a retractable dual leg support 46 is typically attached to the forward portion of the van trailer. Flooring with a plurality of wooden deck members 50 is placed on top of the frame assembly and secured with floor screws to the plurality of cross frame members 49 at the upper flange 53 thereof.

Figure 18:
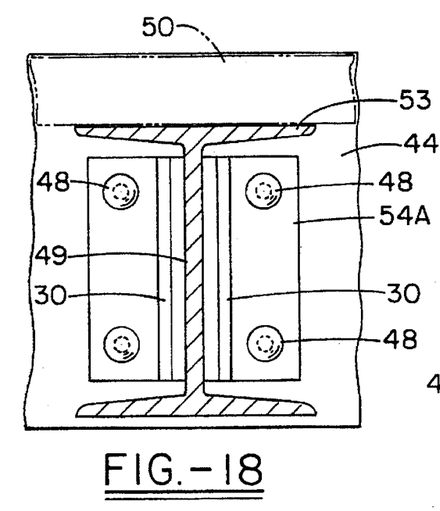
FIG. 18 is an enlarged cross sectional view on lines 18—18 of FIG. 17 showing an attachment of an aluminum clip to the end of a steel cross frame member utilizing a bi-metal element and the attachment of the aluminum clip to the aluminum side rail using aluminum rivets.

Attachment of aluminum clips 54A to the ends of the steel cross frame members 49 is accomplished with the use of bi-metal element 30, as shown in FIG. 18. The clips 54A are then connected to the aluminum side rails 44 using aluminum rivets 48 to connect the steel cross frame members 49 to the side rails 44.

Figure 19:
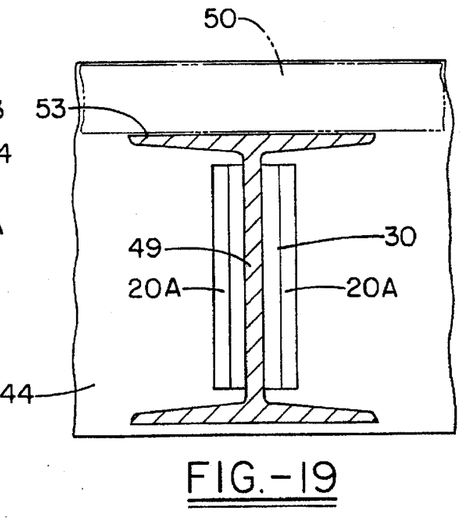
FIG. 19 is a cross sectional view on lines 18—18 of FIG. 17 showing an alternative direct weld connection of a bi-metal element between the aluminum side rail and the steel cross member.

A recommended alternate design is shown in FIG. 19. Therein, a bi-metal element 30 is welded directly to the end of each cross frame member 49 using conventional welding techniques, so that the aluminum portion 20A of the bi-metal element 30 can be directly welded to the aluminum side rail 44 of the composite van trailer.

Figure 20:
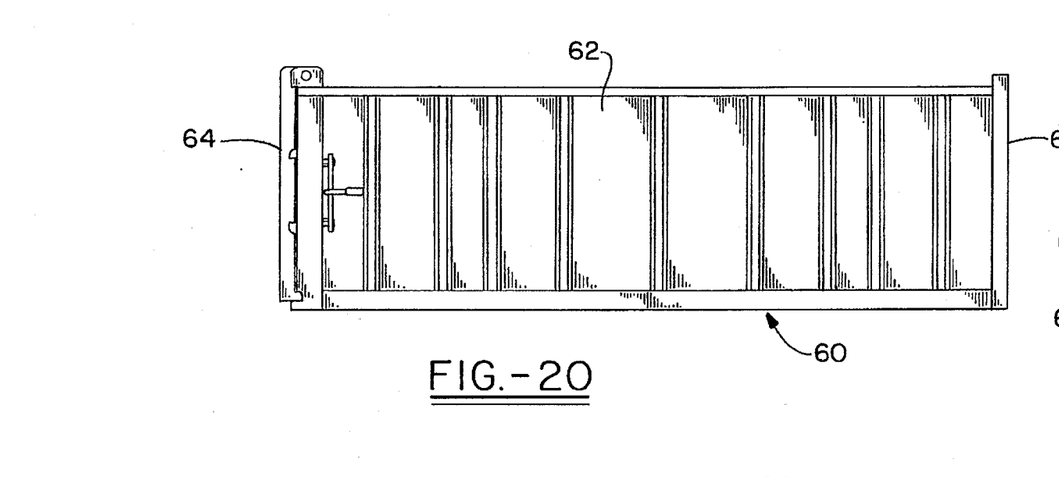
FIG. 20 is a side view of a van type container assembly.
Figure 21:
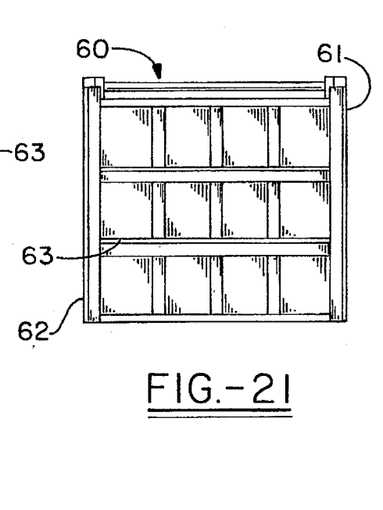
FIG. 21 is an end view of the van type container assembly of FIG. 20.
Figure 22:
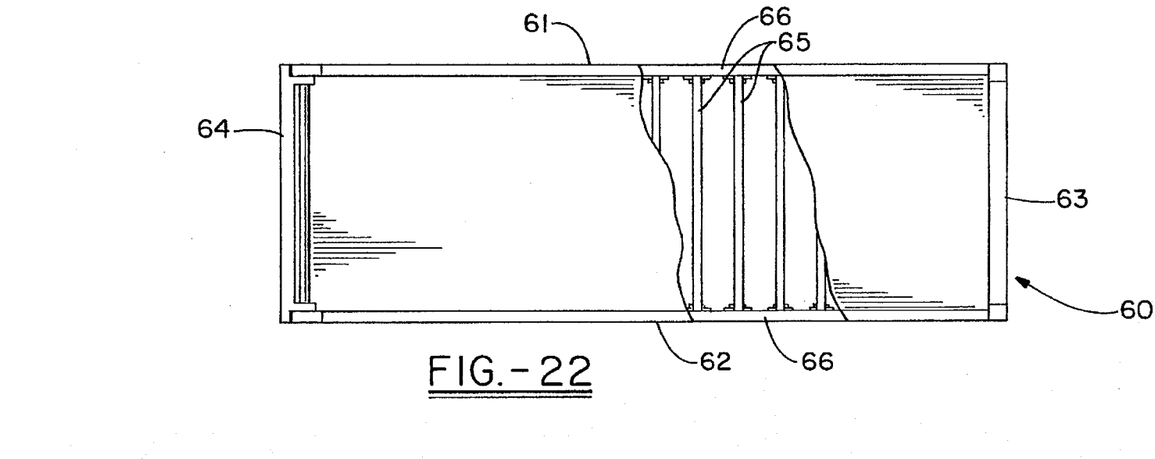
FIG. 22 is a top plan view with a portion broken away of the van type container assembly of FIG. 20.

Turning now to the container portion of the composite van trailer 42, FIGS. 20, 21 and 22 of the drawings show a transportation van type container 60 without wheels. The transportation container 60 is illustrated and is typically of an aluminum construction with opposing side walls 61 and 62, interconnecting bottom, and front wall 63. A hinged door assembly 64 extends between said side walls defining a generally rectangular container configuration. A composite frame assembly is illustrated in FIG. 22 consisting of a plurality of steel cross frame members 65 transversely extending to connect with a pair of oppositely disposed side rails 66.

Using this configuration, the side rails 66 are aluminum which therefore require interconnecting clip 54A and bi-metal element 30 welded to the clips and the cross-frame member in the same manner as here and before illustrated in FIG. 18 of the drawings. An alternate design of attachment using bi-metal element 30 is available as shown in FIG. 19 as here and before described in the composite van trailer construction.

Accordingly, the above specifications contain many specificities which should not be construed as limitations on the scope of the instant invention, but rather as an exemplification of the preferred embodiments thereof. It will be apparent to those skilled in the art that various changes and structural modifications may be made herein without departing from the spirit of the invention. Therefore, the scope of the instant invention should not be determined by the embodiments shown, but rather by the claims appended hereto and their legal equivalents.

Therefore I claim:

1. A composite trailer on wheels having a framework comprising;

a. a frame assembly having a front and rear section, said assembly comprising a plurality of horizontally spaced beams extending from the front section to the rear section, each beam having an opening, the opening in each beam being vertically aligned with the opening in its adjacent beam, said beams being made of a ferrous metal alloy and said frame assembly being attached to said wheels;

b. a cross frame member being located perpendicular to the beams through the vertically aligned openings therein forming an intersection between the cross frame member and each beam, the cross frame member being made of an aluminum metal;

c. a bi-metal element for joining the cross frame member with each beam at each intersection thereof, said bi-metal element having a first and second metal composition, the first metal composition being of an aluminum metal that is substantially similar to the metal composition of the cross frame member, the second metal composition being of a ferrous metal that is substantially similar to the composition of the ferrous metal used for said beams, the bi-metal element being divided along a material transition line between the first metal composition and the second metal composition;

d. the bi-metal element being positioned along side the cross frame member and the beam at each intersection, the first metal composition being welded to the cross frame member by an aluminum weld and the second metal composition being welded to the beam by a ferrous weld.

2. A composite trailer, according to claim 1, wherein each of said beams has an I-shaped cross-sectional configuration with respective upper and lower bidirectional flanges.

3. A composite trailer, according to claim 1 or 2, wherein the cross frame member and each beam intersect at a right angle, and the bi-metal element having a configuration providing a right angle which adjoins the intersecting interface between the beam and the cross frame member.

4. A composite trailer, according to claim 1 or 2, wherein the cross frame member has a cross-sectional C-shaped configuration.

5. A composite trailer, according to claim 1 or 2, wherein the cross frame member has a cross-sectional I-shaped configuration.

6. A composite trailer, according to claim 1 or 2, wherein the cross frame member has a cross-sectional rectangular hollow beam configuration.

7. A composite trailer, according to claim 1, wherein the bi-metal element has a pentagonal configuration.

8. A composite trailer, according to claim 1, further comprising a flat rectilinear plate-like portion secured to the upper surface of the beams.

9. A composite trailer comprising;
 a. a frame assembly comprising at least one beam and at least one cross frame member being positioned in intersecting relationship with said at least one beam forming an intersection between said at least one cross frame member and said at least one beam, the at least one beam and cross frame member being made of a metal material;
 b. at least a trailer bed being attached to said frame assembly, the trailer bed being made of a metal material;
 c. at least a first bi-metal element joining said trailer bed to said at least one beam, said bi-metal element having a first and second metal composition, the first metal composition being substantially similar to the metal composition of said at least one beam, the second metal composition being substantially similar to the composition of said metal material of said trailer bed, said first and second metal materials being dissimilar and wherein said bi-metal element is divided along a material transition line between the first metal composition and the second metal composition.

10. A composite trailer, according to claim 9 wherein the trailer bed and said frame assembly are secured in spaced apart relationship, with at least said first bi-metal element having a configuration to adjoin the trailer bed at the interface with said frame assembly.

11. A composite system for transporting and managing material, having a framework comprising;
 a. a pair of laterally spaced side rails, said side rails being made of a first metal material;
 b. a plurality of cross frame members being made of a second metal material, each of said plurality of cross frame members having opposing ends and each of said plurality of cross frame members being positioned between said pair of laterally spaced side rails so that each of said opposing ends of each of said plurality of cross frame members is positioned adjacent one of said side rails;
 c. each of said plurality of cross frame members having at least two bi-metal elements, each bi-metal element being attached to one of said plurality of cross frame members at an end thereof, the bi-metal elements having a first and second metal composition, the first metal composition being substantially similar to the metal composition of the side rails, the second metal composition being substantially similar to the composition of the plurality of cross frame members, each bi-metal element being divided along a material transition line between the first metal composition and the second metal composition;
 d. wherein the second metal composition of each bi-metal element respectively attaches to one of said plurality of cross frame members to thus secure said one of said cross frame members to one of said side rails.

12. The apparatus set forth in claim 11, wherein the second metal composition of each bi-metal element and the corresponding cross frame member are attached by welding.

13. The apparatus set forth in claim 12, further comprising at least two wheels coupled to the framework of the composite system.

14. The apparatus set forth in claim 11, wherein each cross frame member further comprises:
 a. two flat clips, each clip being attached to one of the ends of one of the cross frame members by a weld between similar metal materials; and
 b. each clip being attached to one of the side rails.

15. The apparatus set forth in claim 14, wherein each clip is connected to one of the side rails using rivets.

16. A trailer formed of composite materials comprising,
 a frame construction including at least one first frame member formed of a first metal material, and at least one second frame member formed of a second metal material, with said at least one second frame member secured in association with said at least one first frame member, wherein said first and second metal materials are dissimilar and are secured in association with one another using at least one joining element formed of at least first and second metal materials which are substantially similar to said metal materials of said at least one first and second frame members, with said at least one first frame member and said at least one second frame member being secured to a similar metal material in said at least one joining element.

17. The trailer as in claim 11, wherein,
 said at least one joining element is a bi-metal element formed of said first and second metal materials with said first and second metal materials respectively forming discrete portions of said bi-metal element and being divided along a material transition line, wherein said at least one first frame member and said at least one second frame member are welded to said at least one joining element in a manner that said first and second metal materials respectively of said at least one first frame member and said at least one second frame member contact only substantially similar materials in said at least one joining element.

18. The trailer as in claim 16, wherein,
 said frame construction forms a floor of said trailer on which is supported a trailer bed, with said at least one first frame member being a supporting beam for said trailer bed, and said at least one second frame member being a cross frame member disposed substantially perpendicularly to said supporting beam.

19. The trailer of claim 18, wherein, said supporting beam includes at least one opening therein, and said at least one cross frame member being supported within said at least one opening by means of said at least one joining element.

20. The trailer as in claim 16, wherein, said first metal material of said at least one first frame member is a ferrous metal alloy, and said second metal material of said at least one second frame member is an aluminum metal.

21. The trailer as in claim 16, wherein, said at least one first frame member and said at least one second frame member are secured in spaced relation to one another by means of said at least one joining element such that said first and second metal materials respectively forming said at least one first frame member and said at least one second frame member do not contact one another.

22. The trailer as in claim 16, wherein, said at least one first frame member and said at least one second frame member are positioned to intersect, forming an intersection interface, wherein said at least one joining element is configured to substantially match said intersecting interface between said at least one first frame member and said at least one second frame member.

23. The trailer as in claim 16, wherein, said at least one joining element isolates said at least one first frame member and said at least one second frame member from one another such that direct contact between said first and second metal materials respectively forming said at least one first frame member and said at least one second frame member is eliminated.

24. A composite trailer comprising;

a floor assembly including at least one beam formed of a first metal material and at least one cross frame member secured in association with said at least one beam, said at least one cross frame member being formed of a second metal material, wherein said at least one beam and at least one cross frame member support a bed portion thereon, wherein said at least one beam and at least one cross frame member are secured by means of at least one joining element being constructed of at least first and second metal compositions, wherein said first metal composition of said at least one joining element is substantially similar to said first metal material of said at least one beam, and said at least one beam is secured thereto, and said second metal composition of said at least one joining element is substantially similar to said second metal material of said at least one cross member, with said at least one cross member being secured thereto to fixedly position said at least one cross member in predetermined relationship with respect to said at least one beam.

25. The composite trailer of claim 24, wherein, said at least one joining element is a bi-metal element including said first and second metal materials compositions which are separately welded to said first and second metals of said at least one beam and said at least one cross frame member respectively.

26. The composite trailer as in claim 24, wherein, said at least one cross frame member is secured in spaced relation to said at least one beam by means of said at least one joining element.

27. The composite trailer as in claim 24, wherein, said at least one beam and said at least one cross frame member are secured in association with one another in intersecting relationship, with said at least one joining element configured to join said at least one beam to said at least one cross frame member along the intersecting interface therebetween.

28. A method of constructing a trailer, comprising the steps of:

forming a supporting frame which includes at least first and second frame members, wherein said first and second frame members are formed of first and second dissimilar metals, positioning said first and second frame members in an intersecting relationship to produce an intersecting interface between said first and second frame members, securing said first and second frame members in association with one another using at least one joining element configured to join said first and second frame members along said intersecting interface, wherein said at least one joining element is formed of at least first and second metal materials which are substantially similar to said first and second metals forming said first and second frame members, respectively, with said first and second frame members being respectively secured to said first and second metal materials of said at least one joining element.

29. The method according to claim 28, wherein said step of securing said first and second frame members in association with one another is carried out by securing said first and second frame members together in spaced apart relationship by means of said at least one joining element.

30. The method according to claim 28, further comprising the steps of forming at least one opening in said first frame member, positioning said second frame member through said at least one opening, and securing said second frame member within said at least one opening by means of said at least one joining element.

31. The method according to claim 28, wherein, said step of securing said first and second frame members in association with one another is carried our by providing said at least one joining element with at least said first and second metal materials which are separated along a material transition line, welding said first frame member to a portion of said at least one joining element constructed of said first metal material, and welding said second frame member to a portion of said at least one joining element constructed of said second metal material.

32. The method according to claim 28, wherein, said first and second metals forming said first and second frame members are a ferrous metal and an aluminum metal respectively, and said first and second metal materials forming said at least one joining element are a ferrous metal and an aluminum metal respectively.

33. The method according to claim 28, further comprising the step of supporting a bed portion on said first and second frame members to produce a floor assembly of said trailer.

* * * * *